US012589590B2

(12) United States Patent
Shiozawa et al.

(10) Patent No.: US 12,589,590 B2
(45) Date of Patent: Mar. 31, 2026

(54) LIQUID EJECTING HEAD AND LIQUID EJECTING APPARATUS

(71) Applicant: SEIKO EPSON CORPORATION, Tokyo (JP)

(72) Inventors: Yu Shiozawa, Shiojiri (JP); Motoki Takabe, Shiojiri (JP); Hitoshi Takaai, Azumino (JP)

(73) Assignee: SEIKO EPSON CORPORATION (JP)

( * ) Notice: Subject to any disclaimer, the term of this patent is extended or adjusted under 35 U.S.C. 154(b) by 259 days.

(21) Appl. No.: 18/502,180

(22) Filed: Nov. 6, 2023

(65) Prior Publication Data

US 2024/0181776 A1 Jun. 6, 2024

(30) Foreign Application Priority Data

Nov. 7, 2022 (JP) ................................ 2022-177893

(51) Int. Cl.
*B41J 2/14* (2006.01)

(52) U.S. Cl.
CPC ....... *B41J 2/14233* (2013.01); *B41J 2/14201* (2013.01); *B41J 2002/14241* (2013.01); *B41J 2002/14491* (2013.01)

(58) Field of Classification Search
CPC ................ B41J 2/14233; B41J 2/14201; B41J 2002/14241; B41J 2002/14491
See application file for complete search history.

(56) References Cited

U.S. PATENT DOCUMENTS

2020/0307212 A1 10/2020 Takabe et al.
2021/0402772 A1* 12/2021 Takabe ................ B41J 2/14201

FOREIGN PATENT DOCUMENTS

JP 2021-024151 A 2/2021

* cited by examiner

*Primary Examiner* — Geoffrey S Mruk
(74) *Attorney, Agent, or Firm* — Harness, Dickey & Pierce, P.L.C.

(57) ABSTRACT

A liquid ejecting head includes: a nozzle; a piezoelectric material; an upper electrode located over the piezoelectric material and electrically coupled to the piezoelectric material; a lower electrode located under the piezoelectric material and electrically coupled to the piezoelectric material; upper-electrode wiring located over the upper electrode and configured to electrically couple the upper electrode to an external power supply; lower-electrode wiring configured to electrically couple the lower electrode to the external power supply; a vibration plate located under the lower electrode and configured to vibrate when the piezoelectric material is driven; and a pressure chamber substrate having a pressure chamber in which vibration of the vibration plate applies pressure to liquid to eject liquid through the nozzle and a first absorption chamber configured to absorb vibration of liquid propagated from the pressure chamber, and the upper electrode and the upper-electrode wiring are present over the first absorption chamber.

15 Claims, 9 Drawing Sheets

LIQUID EJECTING HEAD AND LIQUID EJECTING APPARATUS

The present application is based on, and claims priority from JP Application Serial Number 2022-177893, filed Nov. 7, 2022, the disclosure of which is hereby incorporated by reference herein in its entirety.

BACKGROUND

1. Technical Field

The present disclosure relates to a liquid ejecting head and a liquid ejecting apparatus.

2. Related Art

A liquid ejecting head that ejects liquid in pressure chambers through nozzles by using piezoelectric elements is known. For example, in a liquid ejecting head disclosed in JP-A-2021-024151, a piezoelectric element includes a piezoelectric material, an upper electrode provided over the piezoelectric material, and a lower electrode provided under the piezoelectric material.

A voltage is applied to each electrode via corresponding wiring. In the liquid ejecting head disclosed in JP-A-2021-024151, to increase the upper electrode mass and minimize wiring resistance, wiring for supplying a voltage to the upper electrode is provided so as to cover both edge portions of the pressure chambers from above.

However, pressure chambers were originally designed as functional units that vibrate to eject liquid through nozzles, and hence it is not preferable to provide wiring or the like over the pressure chambers as doing so may degrade vibration characteristics. Thus, a technology for designing a wiring structure for a liquid ejecting head that does not degrade the ejection characteristics is desired.

SUMMARY

The present disclosure can be implemented in the following aspects.

A first aspect of the present disclosure provides a liquid ejecting head. The liquid ejecting head includes: a nozzle; a piezoelectric material configured to be driven by a voltage applied to the piezoelectric material; an upper electrode located over the piezoelectric material and electrically coupled to the piezoelectric material; a lower electrode located under the piezoelectric material and electrically coupled to the piezoelectric material; upper-electrode wiring located over the upper electrode and configured to electrically couple the upper electrode to an external power supply; lower-electrode wiring configured to electrically couple the lower electrode to the external power supply; a vibration plate located under the lower electrode and configured to vibrate when the piezoelectric material is driven; and a pressure chamber substrate having a pressure chamber in which vibration of the vibration plate applies pressure to liquid to eject liquid through the nozzle and a first absorption chamber configured to absorb vibration of liquid propagated from the pressure chamber, and the upper electrode and the upper-electrode wiring are present over the first absorption chamber.

A second aspect of the present disclosure provides a liquid ejecting apparatus. The liquid ejecting apparatus includes: the liquid ejecting head according to the above first aspect; and a controller configured to control ejection operation of ejecting liquid from the liquid ejecting head.

DESCRIPTION OF EMBODIMENTS

A. First Embodiment

A1. Configuration of Liquid Ejecting Apparatus 1

Figure 1:
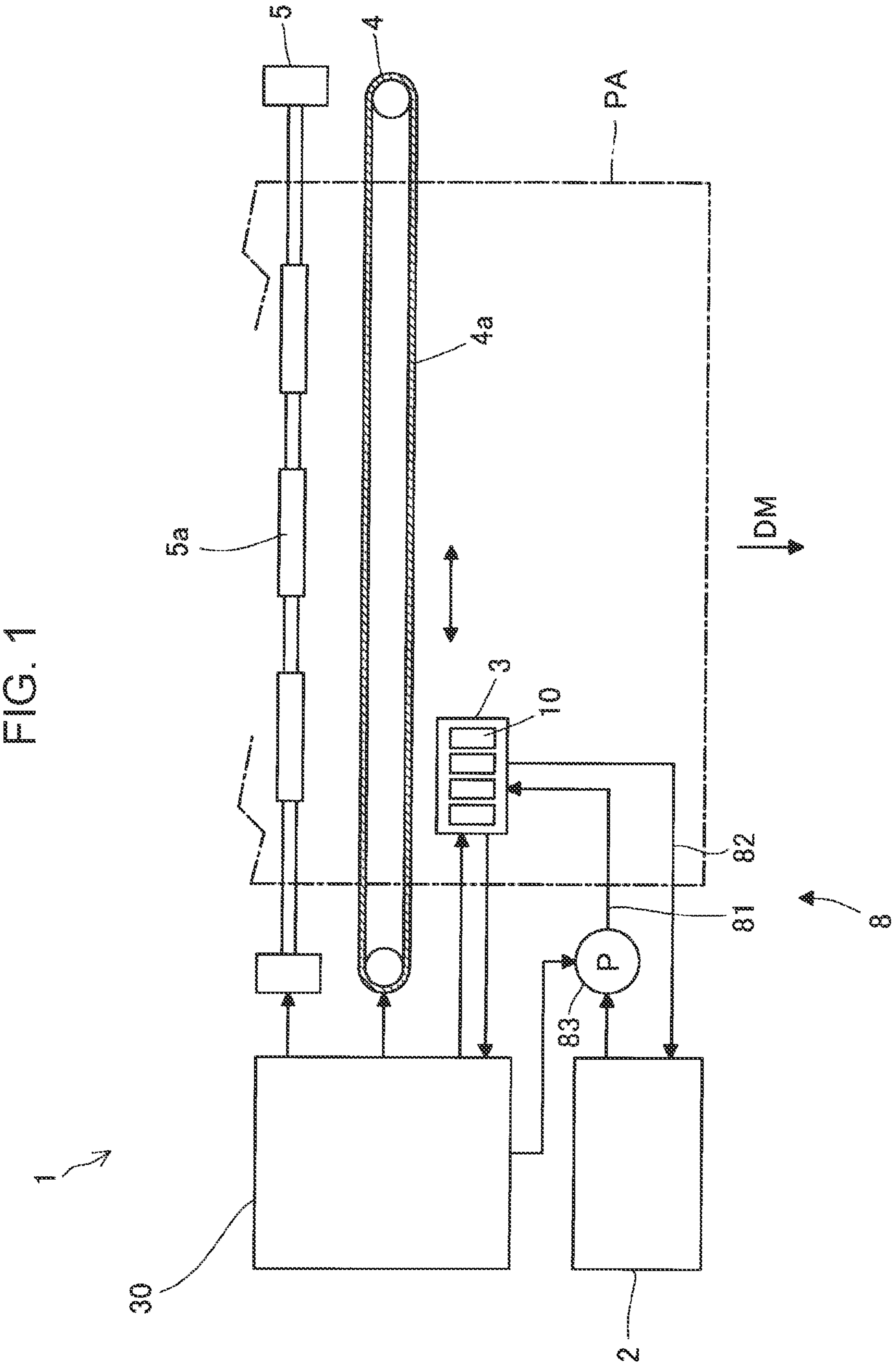
FIG. 1 is an explanatory diagram illustrating the overall configuration of a liquid ejecting apparatus in a first embodiment of the present disclosure.

FIG. 1 is an explanatory diagram illustrating the overall configuration of a liquid ejecting apparatus 1 according to a first embodiment of the present disclosure. In the present embodiment, the liquid ejecting apparatus 1 is an ink jet printer that ejects ink, which is an example of a liquid, onto a print sheet PA, which is a print medium, (hereinafter simply referred to as "sheet PA") to form an image. The liquid ejecting apparatus 1 may be configured to eject ink onto any kinds of media, such as resin films and fabrics, as ink ejection targets, instead of onto the sheet PA.

The liquid ejecting apparatus 1 includes a liquid ejecting head 10 that ejects ink, a liquid container 2 that stores ink, a carriage 3 having the liquid ejecting head 10, a carriage transportation mechanism 4 that transports the carriage 3, a medium transportation mechanism 5 that transports the sheet PA, and a controller 30. The controller 30 is configured to control liquid ejection.

Examples of specific configurations of the liquid container 2 include a cartridge configured to be detachably attached to the liquid ejecting apparatus 1, an ink pack in the form of a bag formed of a flexible film, and an ink tank configured to be refilled with ink. Note that any kind of ink may be stored in the liquid container 2. The liquid ejecting apparatus 1 includes, for example, a plurality of liquid containers 2 associated with four colors of ink. The four colors of ink are, for example, cyan, magenta, yellow, and black. The liquid container 2 may be mounted on the carriage 3.

The liquid ejecting apparatus 1 includes a circulation mechanism 8 that circulates ink. The circulation mechanism 8 includes a supply flow path 81 that supplies ink to the liquid ejecting head 10, a collection flow path 82 that collects the ink discharged from the liquid ejecting head 10, and a pump 83 that causes the ink to flow.

The carriage transportation mechanism 4 includes a transportation belt **4*a* and a motor for transporting the carriage 3. The medium transportation mechanism 5 includes a transportation roller 5***a* and a motor for transporting the sheet PA. The carriage transportation mechanism 4 and the medium transportation mechanism 5 are controlled by the controller 30. The liquid ejecting apparatus 1 ejects ink droplets onto the sheet PA to perform printing by causing the carriage transportation mechanism 4 to transport the carriage 3 while causing the medium transportation mechanism 5 to transport the sheet PA.

Figure 2:
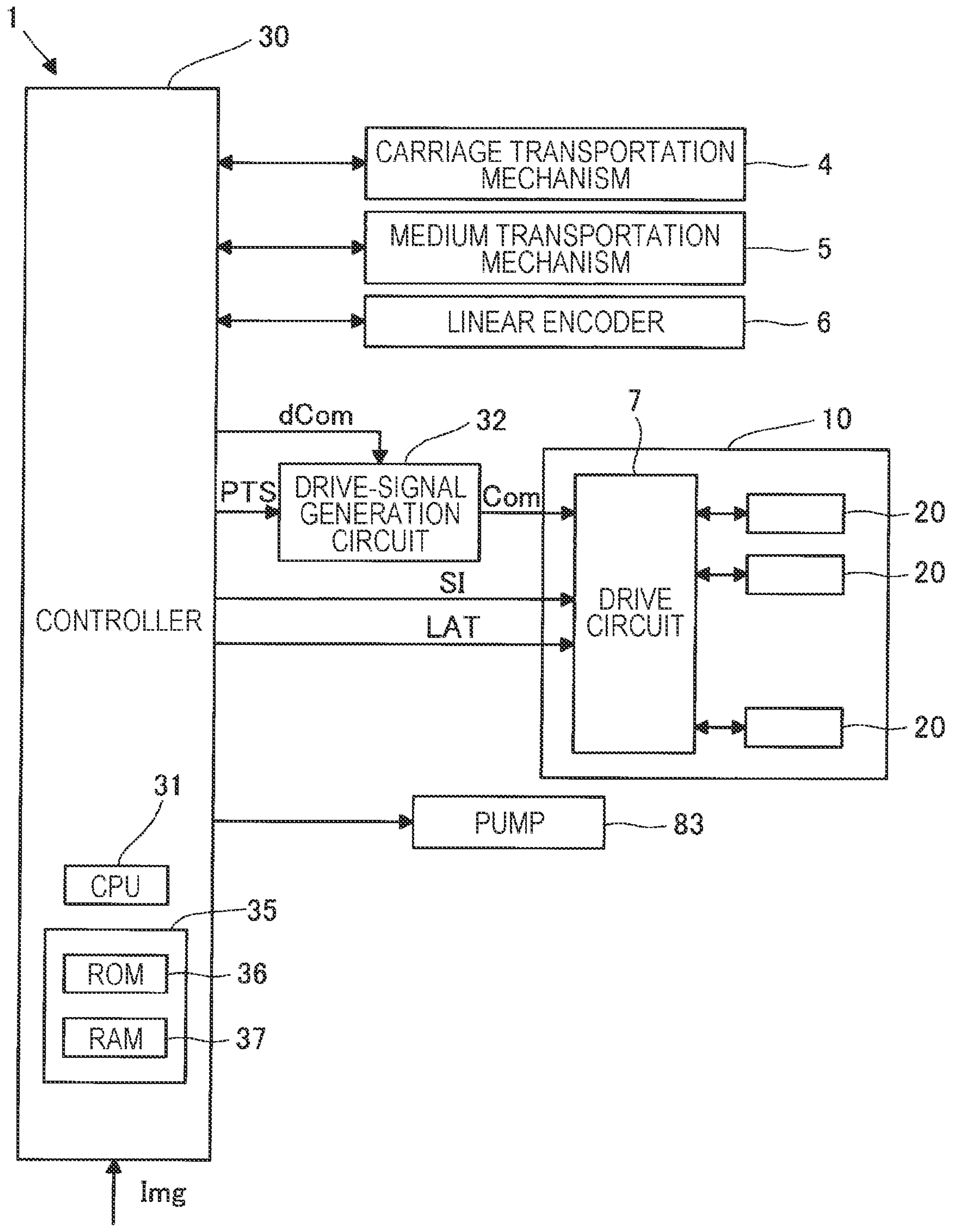
FIG. 2 is a block diagram illustrating the liquid ejecting apparatus.

FIG. 2 is a block diagram illustrating the liquid ejecting apparatus 1. As illustrated in FIG. 2, the liquid ejecting apparatus 1 includes a linear encoder 6. The linear encoder 6 is located at a position where it can detect the position of the carriage 3. The linear encoder 6 obtains information on the position of the carriage 3. The linear encoder 6 outputs an encoder signal to the controller 30 along with the movement of the carriage 3.

The controller 30 includes at least one CPU 31. The controller 30 may include an FPGA instead of or in addition to the CPU 31. The controller 30 includes a storage unit 35. The storage unit 35 includes, for example, ROM 36 and RAM 37. The storage unit 35 may include EEPROM or PROM. The storage unit 35 is configured to store print data Img supplied from a host computer. The storage unit 35 stores a control program for the liquid ejecting apparatus 1.

"CPU" is an abbreviation for "central processing unit". "FPGA" is an abbreviation for "field-programmable gate array". "RAM" is an abbreviation for "random access memory". "ROM" is an abbreviation for "read-only memory". "EEPROM" is an abbreviation for "electrically erasable programmable read-only memory". "PROM" is an abbreviation for "programmable read-only memory".

The controller 30 generates a signal for controlling the operation of each unit in the liquid ejecting apparatus 1. The controller 30 is configured to generate a print signal SI and a waveform specifying signal dCom. The print signal SI is a digital signal for specifying the type of operation of the liquid ejecting head 10. The print signal SI is configured to specify whether to supply a drive signal Com to each piezoelectric element 20. The waveform specifying signal dCom is a digital signal that defines the waveform of the drive signal Com. The drive signal Com is an analog signal for driving each piezoelectric element 20.

The liquid ejecting apparatus 1 includes a drive-signal generation circuit 32. The drive-signal generation circuit 32 is electrically coupled to the controller 30. The drive-signal generation circuit 32 includes a DA conversion circuit. The drive-signal generation circuit 32 generates the drive signal Com having a waveform defined by the waveform specifying signal dCom. The controller 30, when receiving an encoder signal from the linear encoder 6, outputs a timing signal PTS to the drive-signal generation circuit 32. The timing signal PTS defines the timing at which the drive signal Com is to be generated. The drive-signal generation circuit 32 outputs the drive signal Com each time the timing signal PTS is received.

A drive circuit 7 is electrically coupled to the controller 30 and the drive-signal generation circuit 32. The drive circuit 7 switches between whether or not to supply the drive signal Com to each piezoelectric element 20 in accordance with the print signal SI. The drive circuit 7 is configured to select, in accordance with the print signal SI, a latch signal LAT, and a change signal CH supplied by the controller 30, the piezoelectric elements 20 to which the drive signal Com is to be supplied. The latch signal LAT defines the latch timing at which the print data Img is to be latched. The change signal CH defines the selection timing at which a drive pulse included in the drive signal Com is to be selected.

The controller 30 controls ink ejection operation of the liquid ejecting head 10. The controller 30 drives the piezoelectric elements 20 to change the pressure of ink in pressure chambers C and to eject ink through nozzles N. Detailed configurations of the piezoelectric element 20, the pressure chamber C, the nozzle N, and the like will be described later. The controller 30 controls ejection operation when performing a print operation.

A2. Configuration of Liquid Ejecting Head 10

Figure 3:
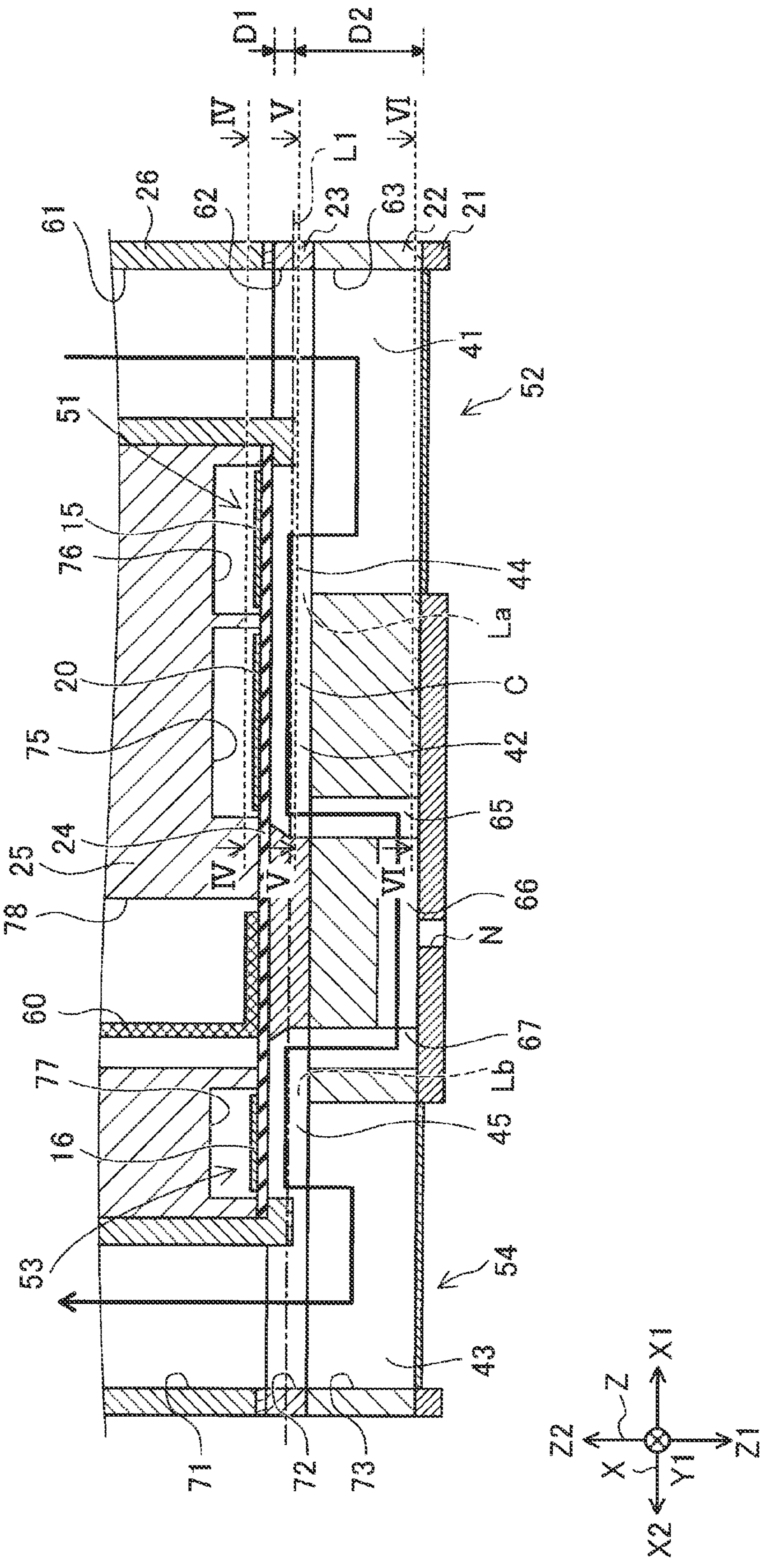
FIG. 3 is a partial cross-sectional view of a liquid ejecting head.

Next, the configuration of the liquid ejecting head 10 will be described. FIG. 3 is a partial cross-sectional view of the liquid ejecting head 10. In the following description, the three directions intersecting one another are referred to as the X-axis direction, the Y-axis direction, and the Z-axis direction. The liquid ejecting head 10 employs a circulation method in which liquid is circulated through a supply-side common flow path 41, individual flow paths 42, and a discharge-side common flow path 43 described later.

The X-axis direction corresponds to the right-left direction in FIG. 3 and includes the X1 direction (the right direction in FIG. 3) and the X2 direction (the left direction in FIG. 3) opposite to each other. The Y-axis direction includes the Y1 direction and the Y2 direction opposite to each other. The Y1 direction is the direction into the drawing plane in FIG. 3. The Y2 direction is the direction out of the drawing plane in FIG. 3. The Z-axis direction corresponds to the up-down direction in FIG. 3 and includes the Z1 direction (the downward direction in FIG. 3) and the Z2 direction (the upward direction in FIG. 3) opposite to each other. Note that in the following description, the Z1 direction is sometimes also referred to as the downward direction, and the Z2 direction as the upward direction.

In addition, the X2 side corresponds to an example of the first side, and the X1 side corresponds to an example of the second side. Thus, in the following, the X2 side is also referred to as the first side, and the X1 side as the second side. The X-axis direction, the Y-axis direction, and the Z-axis direction are orthogonal to one another. Although the Z-axis direction is typically the up-down direction, the Z-axis direction does not have to be the up-down direction. In the following description, the Z1 direction is referred to as "upward" in some cases, and the Z2 direction is referred to as "downward" in some cases.

In the present specification, the terms "supply side" and "discharge side" are used in some cases. The supply side is the portion of the liquid flow path upstream of the nozzles N. Components related to portions upstream of the nozzles N are referred to using "supply side" in some cases, and components related to portions downstream of the nozzles N are referred to using "discharge side" in some cases.

The liquid ejecting head 10 includes a nozzle substrate 21, a communication plate 22, a pressure chamber substrate 23, a vibration plate 24, a sealing plate 25, and piezoelectric elements 20. The liquid ejecting head 10 also includes a case 26 and a COF 60. "COF" is an abbreviation for "chip on film". The COF 60 is a mounting component having a plurality of wiring patterns for electrically coupling the controller 30 and the liquid ejecting head 10. The COF 60 corresponds to a wiring substrate.

In addition, the liquid ejecting head 10 includes the supply-side common flow path 41, the plurality of individual flow paths 42, the discharge-side common flow path 43, the plurality of pressure chambers C, a first absorption chamber 44, a second absorption chamber 45, a first compliance portion 51, a second compliance portion 52, a third compliance portion 53, and a fourth compliance portion 54. Since the plurality of individual flow paths 42 and the plurality of pressure chambers C are aligned in the Y-axis direction, FIG. 3 illustrates only one each of these components. The present embodiment describes the liquid ejecting head 10 that ejects ink, which is an example of a liquid. The liquid is not limited to ink, and the liquid ejecting head 10 is configured to eject other types of liquid.

The thickness direction of each of the nozzle substrate 21, the communication plate 22, the pressure chamber substrate 23, the vibration plate 24, the sealing plate 25, and the case 26 corresponds to the Z-axis direction. The nozzle substrate 21 is located at the bottom of the liquid ejecting head 10. The communication plate 22 is located on the Z2 direction side of the nozzle substrate 21. The pressure chamber substrate 23 is located on the Z2 direction side of the communication plate 22. In other words, the communication plate 22 is located between the pressure chamber substrate 23 and the nozzle substrate 21. The vibration plate 24 is located on the Z2 direction side of the pressure chamber substrate 23. The vibration plate 24 is formed of, for example, $SiO_2$. The vibration plate 24 will be described in detail later. The vibration plate 24 is a member separate from the pressure chamber substrate 23. The vibration plate 24 may be attached to the pressure chamber substrate 23 with an adhesive or may be formed on the surface of the pressure chamber substrate 23 facing the Z2 direction by treatment such as thermal oxidation.

The sealing plate 25 is located on the Z2 direction side of the vibration plate 24. The sealing plate 25 covers the vibration plate 24, the first compliance portion 51 and the third compliance portion 53, the piezoelectric elements 20, and the pressure chamber substrate 23. The case 26 is located on the sealing plate 25. The piezoelectric elements 20 are provided to be associated with the pressure chambers C.

Description of Flow Path

First, the liquid flow path formed in the liquid ejecting head 10 will be described. The liquid flow path includes a supply port and a discharge port (not illustrated), the supply-side common flow path 41, the plurality of individual flow paths 42, and the discharge-side common flow path 43. The boundary La between the supply-side common flow path 41 and the individual flow paths 42 is indicated by a dashed line in FIG. 3. Note that a publicly known flow restrictor (not illustrated) is provided at the boundary between the supply-side common flow path 41 and each individual flow path 42.

The supply-side common flow path 41 is provided to be common to the plurality of pressure chambers C. The supply-side common flow path 41 is continuous in the Y-axis direction along the plurality of pressure chambers C. The supply-side common flow path 41 includes a liquid chamber portion 61 formed in the case 26, a liquid chamber portion 62 formed in the pressure chamber substrate 23, and a liquid chamber portion 63 formed in the communication plate 22. These liquid chamber portions 61, 62, and 63 are continuous in the Z-axis direction.

The first absorption chamber 44 is an absorption chamber on the supply side and is located in the X1 direction relative to the pressure chambers C. The first absorption chamber 44 communicates with upstream portions of the pressure chambers C. The first absorption chamber 44 is part of the supply-side common flow path 41.

The plurality of individual flow paths 42 are provided for the respective pressure chambers C and aligned in the Y-axis direction. The individual flow paths 42 are located downstream of the supply-side common flow path 41. The individual flow paths 42 communicate with a downstream portion of the liquid chamber portion 62 formed in the pressure chamber substrate 23. Each individual flow path 42 includes a pressure chamber C, a first communication flow path 65, a second communication flow path 66, and a third communication flow path 67 in this order from upstream to downstream.

The plurality of pressure chambers C communicate with the respective nozzles N via the first communication flow paths 65 and the second communication flow paths 66. Each nozzle N is located in the Z1 direction relative to the corresponding pressure chamber C. The plurality of first communication flow paths 65 extend in the Z-axis direction. The plurality of second communication flow paths 66 are coupled to Z1-direction end portions of the first communication flow paths 65 and extend in the X2 direction. The nozzles N are located substantially at the centers of the second communication flow paths 66 in the X-axis direction. The plurality of third communication flow paths 67 are coupled to X2-direction end portions of the second communication flow paths 66 and extend in the Z2 direction.

The discharge-side common flow path 43 is provided to be common to the plurality of pressure chambers C. The discharge-side common flow path 43 communicates in common with the plurality of individual flow paths 42. The discharge-side common flow path 43 communicates with each pressure chamber C via the corresponding individual flow path 42. The discharge-side common flow path 43 is located downstream of the individual flow paths 42.

The discharge-side common flow path 43 is continuous in the Y-axis direction. The discharge-side common flow path 43 includes a liquid chamber portion 71 formed in the case 26, a liquid chamber portion 72 formed in the pressure chamber substrate 23, and a liquid chamber portion 73 formed in the communication plate 22. These liquid chamber portions 71, 72, and 73 are continuous in the Z-axis direction. Note that the liquid chamber portions 61 and 71 are through holes formed in the case 26.

Description of Each Substrate

Figure 4:
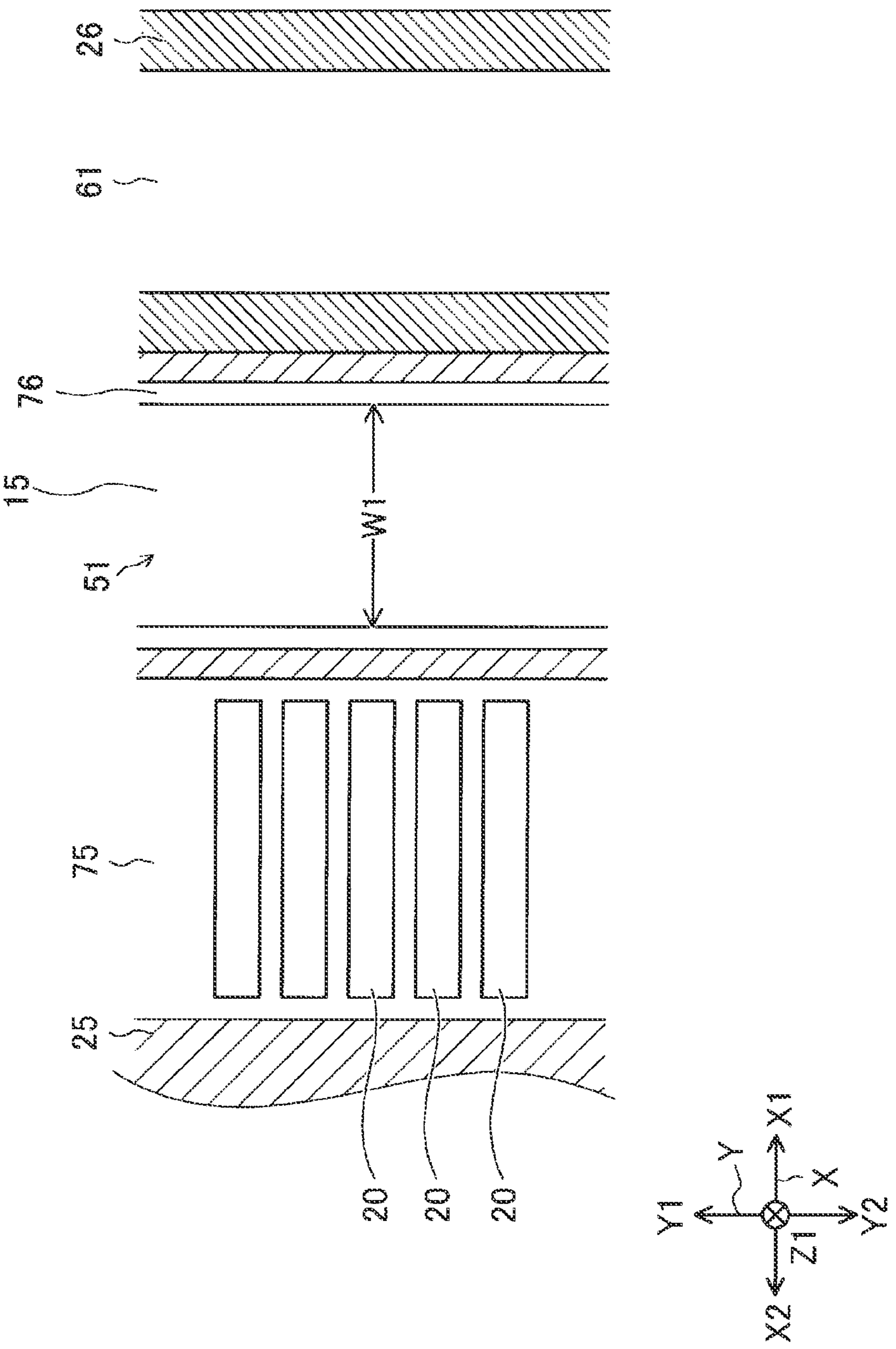
FIG. 4 is a cross-sectional view of the liquid ejecting head taken along line IV-IV in FIG. 3.
Figure 5:
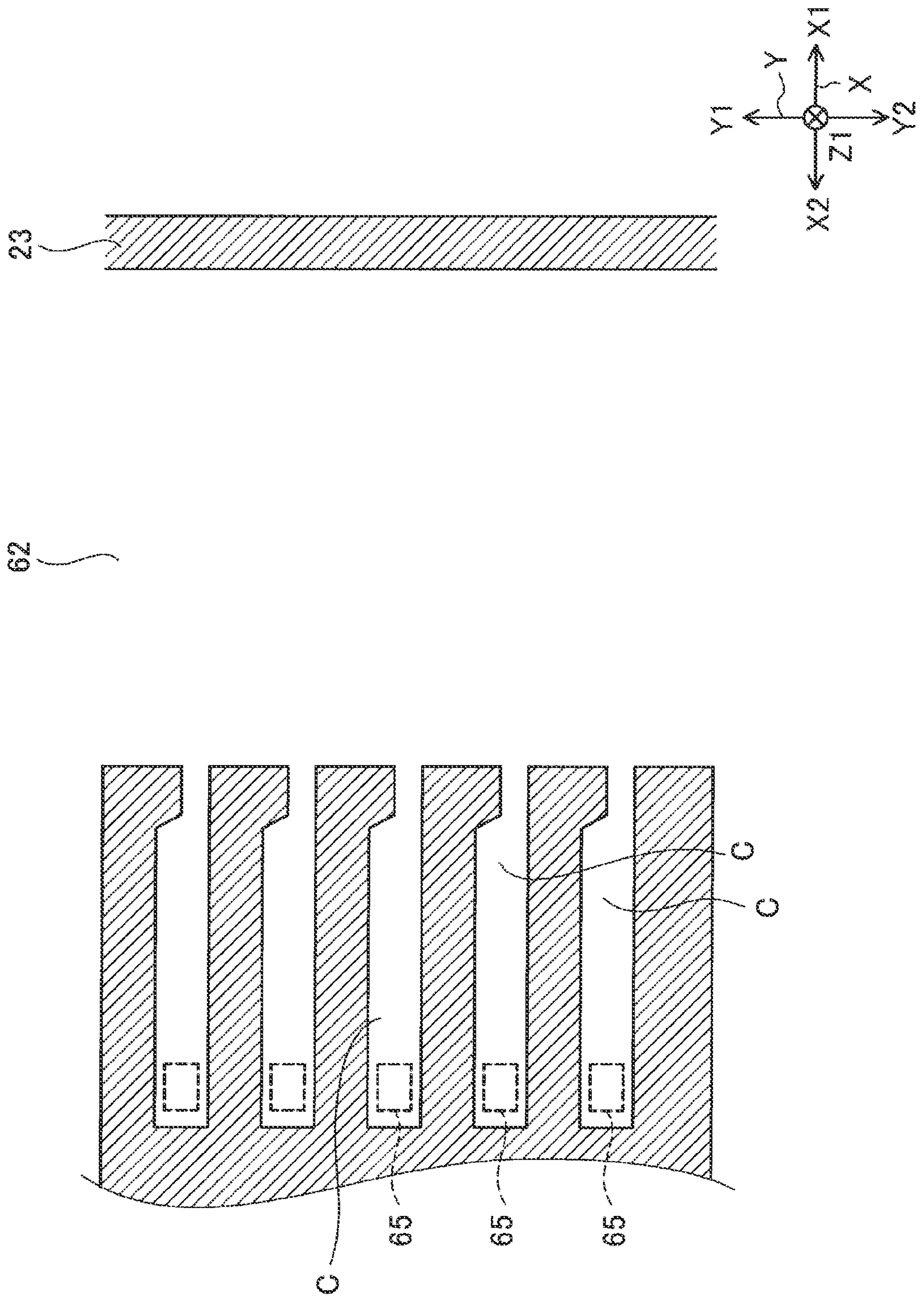
FIG. 5 is a cross-sectional view of the liquid ejecting head taken along line V-V in FIG. 3.
Figure 6:
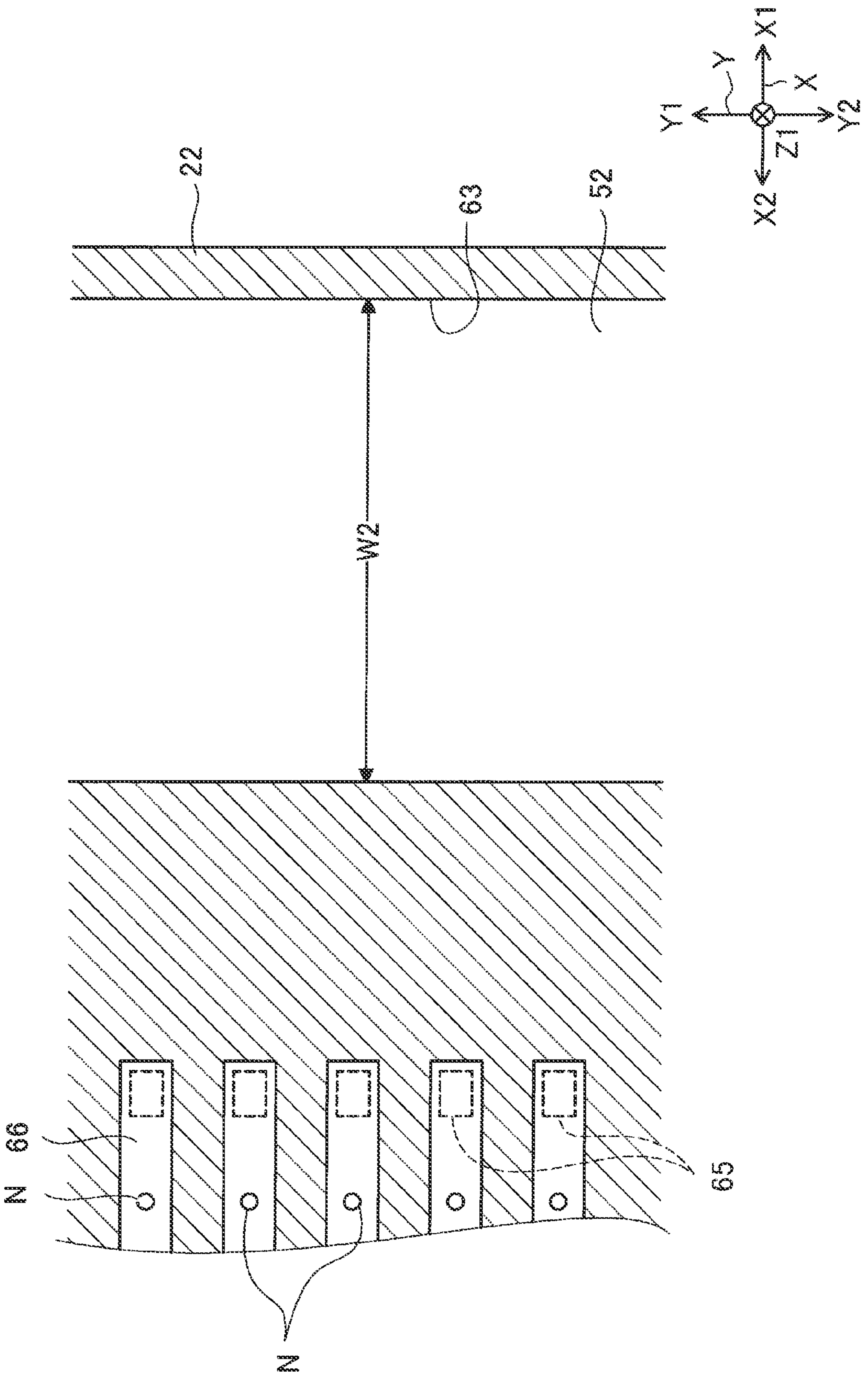
FIG. 6 is a cross-sectional view of the liquid ejecting head taken along line VI-VI in FIG. 3.

FIGS. 4 to 6 are cross-sectional views of the liquid ejecting head 10. FIG. 4 is a cross-sectional view taken along line IV-IV in FIG. 3, FIG. 5 is a cross-sectional view taken along line V-V in FIG. 3, and FIG. 6 is a cross-sectional view taken along line VI-VI in FIG. 3. In the following, the structure of each substrate included in the liquid ejecting head 10 will be described with reference to FIGS. 3 to 6 as necessary. As illustrated in FIG. 3, the nozzle substrate 21 has the nozzles N extending through the nozzle substrate 21 in the Z direction. As described above, the liquid ejecting head 10 ejects liquid through these nozzles N. In the nozzle substrate 21, the plurality of nozzles N arranged in the Y-axis direction form a nozzle row. The nozzle substrate 21 is formed of, for example, a metal such as stainless steel, an organic substance such as a polyimide resin, a silicon single crystal substrate, or the like.

As illustrated in FIGS. 3 and 5, the pressure chamber substrate 23 has the supply-side liquid chamber portion 62, the first absorption chamber 44, the pressure chambers C, the second absorption chamber 45, and the discharge-side liquid chamber portion 72. The pressure chambers C, the absorption chambers 44 and 45, and the liquid chamber portions 62 and 72 are part of the liquid flow path. The pressure chambers C, the absorption chambers 44 and 45, and the liquid chamber portions 62 and 72 extend in the X-axis direction. The pressure chambers C, the absorption chambers 44 and 45, and the liquid chamber portions 62 and 72 each extend through the pressure chamber substrate 23 in the Z-axis direction. The pressure chambers C, the absorption chambers 44 and 45, and the liquid chamber portions 62 and 72 each have a specified capacity.

The plurality of pressure chambers C are aligned at specified intervals in the Y-axis direction. The set of pressure chambers C is located at the same position in the Y-axis direction as the first absorption chamber 44 and the second absorption chamber 45. The pressure chambers C and the first absorption chamber 44 located at the same position in the Y-axis direction adjoin each other and communicate with each other in the X-axis direction. The supply-side liquid chamber portion 62, together with the liquid chamber portion 61 formed in the case 26 and the liquid chamber portion 63 formed in the communication plate 22, forms the supply-side common flow path 41.

The pressure chamber substrate 23 in the present embodiment is formed of a silicon single crystal substrate. In another embodiment, the pressure chamber substrate 23 may be formed of, for example, a metal such as stainless steel (SUS) or nickel (Ni); a ceramic material typified by zirconia ($ZrO_2$) or alumina ($Al_2O_3$); a glass-ceramic material; an oxide such as magnesium oxide (MgO) or lanthanum aluminate ($LaAlO_3$); or the like. In the present embodiment, the pressure chambers C and the absorption chambers 44 and 45 are formed by, for example, processing the pressure chamber substrate 23 by anisotropic etching. Details of the functions of the pressure chambers C and the absorption chambers 44 and 45 will be described later.

The communication plate 22 is located between the nozzle substrate 21 and the pressure chamber substrate 23 and is fixed to the nozzle substrate 21 with an adhesive or the like. The communication plate 22 is formed of, for example, a silicon single crystal substrate. As illustrated in FIGS. 3 and 6, the communication plate 22 has the supply-side liquid chamber portion 63, the discharge-side liquid chamber portion 73, the first communication flow paths 65, the second communication flow paths 66, and the third communication flow paths 67. Each of the liquid chamber portions 63 and 73, the first communication flow paths 65, and the third communication flow paths 67 extends through the communication plate 22 in the Z direction. The second communication flow paths 66 do not extend through the communication plate 22 in the Z direction. The second communication flow paths 66 are recesses in the lower surface of the communication plate 22. The liquid chamber portion 73, together with the liquid chamber portion 71 formed in the case 26 and the liquid chamber portion 72 formed in the pressure chamber substrate 23, forms the discharge-side common flow path 43.

As illustrated in FIG. 3, the sealing plate 25 is a member having recesses in the lower surface in the Z1 direction. The recesses are open on the Z2 side of the pressure chambers C and the absorption chambers 44 and 45 at the positions facing the pressure chambers C and the absorption chambers 44 and 45. Specifically, the recesses of the sealing plate 25 of the present embodiment are a first recess 75, a second recess 76, and a third recess 77.

The first recess 75 is open at a position facing the pressure chambers C. The second recess 76 is open at a position facing the first absorption chamber 44. The third recess 77 is open at a position facing the second absorption chamber 45. The recesses 75, 76, and 77 are separated by wall portions formed as parts of the sealing plate 25. In the present embodiment, the depth of the opening in each of the recesses 75, 76, and 77 is the same. In other words, the dimension of each of the recesses 75, 76, and 77 in the Z direction is the same.

The recesses 75, 76, and 77 do not communicate with the liquid flow path, and hence, liquid does not flow in the recesses 75, 76, and 77. Of the widths of the recesses 75, 76, and 77 in the X-axis direction, the width of the first recess 75 is the largest, the width of the second recess 76 is the second largest, and the width of the third recess 77 is the smallest. As illustrated in FIGS. 3 and 4, the first recess 75, the second recess 76, and the third recess 77 extend across the width of the liquid ejecting head 10 in the Y-axis direction. The widths of the second recess 76 and the third recess 77 in the Y-axis direction are the same. A through hole 78 extends through the sealing plate 25 in the Z-axis direction at a position on the X2 direction side of the center portion in the X-axis direction. The above COF 60 is inserted into the through hole 78. As viewed in the up-down direction (the Z direction), the COF 60, the pressure chambers C, and the first absorption chamber 44 are arranged from the first side to the second side in this order. The distance (flow path length) from each pressure chamber C to the first absorption chamber 44 in the X-axis direction is shorter than the distance (flow path length) from each pressure chamber C to the second absorption chamber 45.

The vibration plate 24 is stacked on the pressure chamber substrate 23. The piezoelectric elements 15, 16, and 20 are stacked on the vibration plate 24. The plurality of piezoelectric elements 20 are located in the first recess 75. The piezoelectric element 15 is located in the second recess 76. The piezoelectric element 16 is located in the third recess 77. The piezoelectric elements 20 are ones for liquid ejection.

The piezoelectric elements 15, 16, and 20 will be described in detail later. The piezoelectric elements 20 are actuators driven by the voltages applied via upper and lower electrodes. Although the piezoelectric elements 15 and 16 each have a configuration approximately the same as or similar to that of the piezoelectric element 20 in that the piezoelectric elements 15 and 16 each have one or two electrodes and a piezoelectric material, they are not for applying pressure to the liquid in the flow path but for absorbing vibration. Hence, the piezoelectric elements 15 and 16 are not electrically coupled to the controller 30 to be driven. Note that specific configurations of the piezoelectric elements 15, 16, and 20 and the configurations of their peripheries will be described in detail later with reference to FIGS. 7 to 9.

Description of Compliance Portions

Next, the configurations of the first compliance portion 51 to the fourth compliance portion 54 will be described. The first compliance portion 51 is an absorbing portion for absorbing vibration of liquid on the supply side. The first compliance portion 51 includes the vibration plate 24 and the piezoelectric element 15. As illustrated in FIG. 4, the first compliance portion 51 is continuous in the Y-axis direction across the width of the discharge-side common flow path 43 in the Y-axis direction. The piezoelectric element 15 continuous in the Y-axis direction across the width of the vibration plate 24 in the Y-axis direction is formed on the vibration plate 24. The width W1 of the first compliance portion 51 in the X-axis direction corresponds to the width of the piezoelectric element 15 in the X-axis direction. The vibration plate 24 is configured to deform in response to the pressure of the liquid. The vibration plate 24 is configured to absorb a fluctuation in the pressure of the liquid in the first absorption chamber 44 by deforming in response to the pressure of the liquid. The piezoelectric element 15 is located at a position where the piezoelectric element 15 overlaps the first absorption chamber 44 as viewed in the Z-axis direction.

The second compliance portion 52 is an absorbing portion for absorbing vibration of liquid on the supply side. The second compliance portion 52 is located on the Z1 direction side of the communication plate 22. The second compliance portion 52 is a flexible film that absorbs a fluctuation in the pressure of the liquid in the supply-side common flow path 41. As illustrated in FIG. 3, the second compliance portion 52 is located at the lower surface of the communication plate 22 so as to close the Z1-direction-side opening of the liquid chamber portion 63 in the communication plate 22 and serves as a wall surface (specifically, a bottom surface) of the supply-side common flow path 41.

Here, the line L1 on the XY plane passing through the center position of the pressure chambers C in the Z direction and including the X-axis and the Y-axis is defined as the reference position of the pressure chambers C. The distance D1 between the pressure chambers C and the first compliance portion 51 in the Z-axis direction is shorter than the distance D2 between the pressure chambers C and the second compliance portion 52 in the Z-axis direction. The distance D1 is from the reference position of the pressure chambers C to the bottom surface of the vibration plate 24. The distance D2 is from the reference position of the pressure chambers C to the upper surface of the second compliance portion 52. Note that the flow path length from the pressure chambers C to the first compliance portion 51 is shorter than the flow path length from the pressure chambers C to the second compliance portion 52.

The thickness of the second compliance portion 52 in the Z-axis direction is smaller than the thickness of the first compliance portion 51 in the Z-axis direction. The width W2 (see FIG. 6) of the second compliance portion 52 in the X-axis direction is larger than the width W1 (see FIG. 4) of the first compliance portion 51 in the X-axis direction. The width of the first compliance portion 51 in the Y-axis direction and the width of the second compliance portion 52 in the Y-axis direction are substantially the same.

With respect to the physical properties, the dimensions, and the like of the first compliance portion 51 and the second compliance portion 52 described above, the compliance performance of the second compliance portion 52 is higher than the compliance performance of the first compliance portion 51. Here, "compliance performance" has the same meaning as "compliance volume" and can be expressed by the following expression (1).

$$C = \frac{1-\nu^2}{60E} \cdot \frac{w^5 l}{t^3}$$

In expression (1), ν is Poisson's ratio of the vibration plate 24 and serves as a physical property value of the material forming the compliance portion. E is Young's modulus and serves as a physical property value of the material forming the compliance portion.

In expression (1), w is the length in the X-axis direction of the opening covered by the compliance portion, l is the length in the Y-axis direction of the opening covered by the compliance portion, and t is the thickness of the compliance portion. Here, because w<1, the above symbols represent the above conditions. However, when w>l, w represents the length in the Y-axis direction, and l represents the length in the X-axis direction.

The third compliance portion 53 is an absorbing portion for absorbing vibration of liquid on the discharge side. The third compliance portion 53 has a configuration substantially the same as that of the first compliance portion 51 and includes the vibration plate 24 and the piezoelectric element 16. The vibration plate 24 included in the third compliance portion 53 is continuous in the Y-axis direction. The width of the third compliance portion 53 in the X-axis direction corresponds to the width of the plurality of piezoelectric elements 16 in the X-axis direction. The vibration plate 24 is configured to deform in response to the pressure of the liquid. The vibration plate 24 is configured to absorb a fluctuation in the pressure of the liquid in the second absorption chamber 45 by deforming in response to the pressure of the liquid.

The piezoelectric element 16 continuous in the Y-axis direction across the width of the vibration plate 24 in the Y-axis direction is formed on the vibration plate 24. The piezoelectric element 16 is located at a position where the piezoelectric element 16 overlaps the second absorption chamber 45 as viewed in the Z-axis direction.

The fourth compliance portion 54 is an absorbing portion for absorbing vibration of liquid on the discharge side. The fourth compliance portion 54 is located on the Z1 direction side of the communication plate 22. The fourth compliance portion 54 is a flexible film that absorbs a fluctuation in the pressure of the liquid in the discharge-side common flow path 43. The fourth compliance portion 54 is located at the lower surface of the communication plate 22 so as to close the Z1-direction-side opening of the liquid chamber portion 73 in the communication plate 22 and serves as a wall surface (specifically, a bottom surface) of the discharge-side common flow path 43.

Here, the distance between the pressure chambers C and the third compliance portion 53 in the Z-axis direction is the same as the distance D1 between the pressure chambers C and the first compliance portion 51 in the Z-axis direction. The distance between the pressure chambers C and the fourth compliance portion 54 in the Z-axis direction is the same as the distance D2 between the pressure chambers C and the second compliance portion 52 in the Z-axis direction. In other words, the distance D1 between the pressure chambers C and the third compliance portion 53 in the Z-axis direction is shorter than the distance D2 between the pressure chambers C and the fourth compliance portion 54 in the Z-axis direction.

Note that it is preferable to form the compliance portions 51 to 54 each with sufficient flexibility to absorb vibration of liquid propagated from the pressure chambers C by adjusting the materials forming the above compliance portions 51 to 54, the thicknesses of the compliance portions 51 to 54, and the like. Note that since the piezoelectric elements 15 and 16 located in the second recess 76 and the third recess 77 are not for applying pressure to the liquid in the pressure chambers, unlike the piezoelectric elements 20 in the first recess 75, the piezoelectric elements 15 and 16 are not electrically coupled to the controller 30.

Configurations of Piezoelectric Elements 15, 16, and 20 and Wiring

Figure 7:
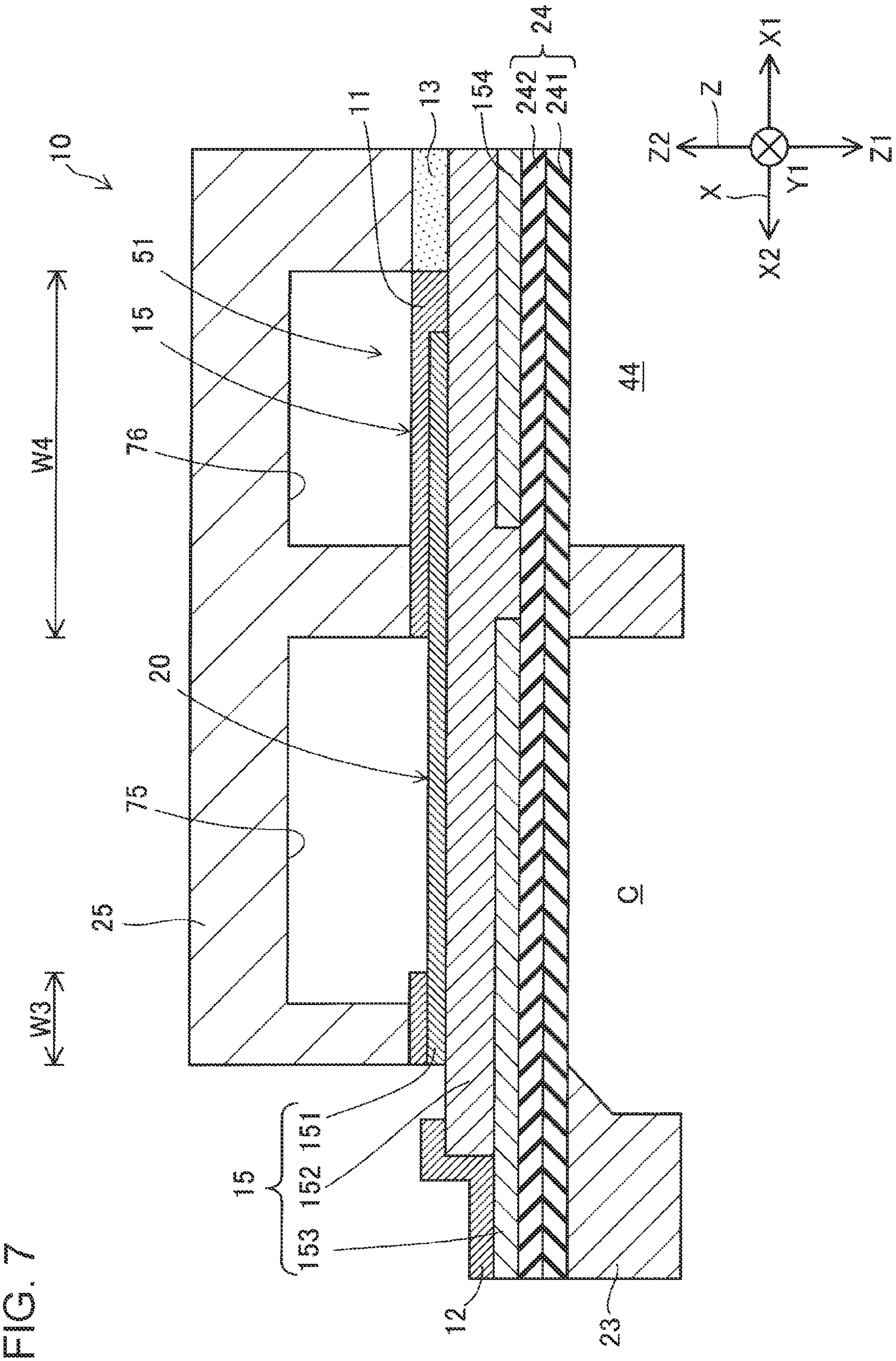
FIG. 7 is an enlarged cross-sectional view of a vibration plate, a piezoelectric element, and part of their vicinities.

FIG. 7 is an enlarged cross-sectional view of the vibration plate 24, the piezoelectric elements 20 and 15, and their vicinities. The vibration plate 24 vibrates when the piezoelectric element 20 is driven. As illustrated in FIG. 7, the vibration plate 24 has a stacked structure including a first insulation layer 241 and a second insulation layer 242. The first insulation layer 241 is in contact with the pressure chamber substrate 23. The second insulation layer 242 is located on the side of the first insulation layer 241 opposite to the pressure chamber substrate 23.

The first insulation layer 241 is an elastic film formed of an elastic material such as silicon dioxide ($SiO_2$). The second insulation layer 242 is formed of an insulation material such as zirconium dioxide ($ZrO_2$). Each of the first insulation layer 241 and the second insulation layer 242 is formed by a publicly known film formation technique such as thermal oxidation or sputtering. Note that the vibration plate 24 and part or all of the pressure chamber substrate 23 can be formed integrally by selectively removing portions in the thickness direction of the areas corresponding to the pressure chambers C of a plate-shaped member with a specified thickness.

The sealing plate 25 is fixed onto the upper surface of the vibration plate 24 by, for example, an adhesive 13. Briefly, the piezoelectric elements 20 have a stacked structure including lower electrodes 153, a piezoelectric material 152, and an upper electrode 151 stacked on the vibration plate 24 in this order. The upper electrode 151 is located over the piezoelectric material 152. The lower electrodes 153 are located under the piezoelectric material 152.

The lower electrodes 153 are formed on the upper surface of the vibration plate 24. The lower electrodes 153 are individual electrodes formed separately from each other for the respective piezoelectric elements 20. Drive signals having changing voltages are applied to the lower electrodes 153. The lower electrodes 153 are aligned at intervals in the Y-axis direction. The lower electrodes 153 are formed of a conductive material, such as platinum (Pt) or iridium (Ir).

The piezoelectric material 152 is formed on the lower electrodes 153, is located over the pressure chambers C and the first absorption chamber 44, and is in contact with the lower electrodes 153. The piezoelectric material 152 is a belt-shaped dielectric film continuous in the Y-axis direction so as to correspond to the plurality of piezoelectric elements 20. The piezoelectric material 152 is formed of a publicly known piezoelectric material, such as lead zirconate titanate ($Pb(Zr,Ti)O_3$).

The upper electrode 151 is in contact with the piezoelectric material 152. The upper electrode 151 is a common electrode extending in the Y-axis direction to be continuous so as to correspond to the plurality of piezoelectric elements 20. The upper electrode 151 is one continuous member extending from over the pressure chambers C to over the first absorption chamber 44. A specified reference voltage is applied to the upper electrode 151. The reference voltage is constant and set to, for example, a voltage higher than the ground voltage. In other words, for example, a hold signal having a constant voltage is applied to the upper electrode 151. The voltage corresponding to the difference between the reference voltage applied to the upper electrode 151 and the drive signal supplied to each lower electrode 153 is applied to the piezoelectric material 152. The drive signal differs depending on the amount of liquid to be ejected. The hold signal is constant regardless of the amount of liquid to be ejected. Note that a configuration in which the ground voltage is applied to the upper electrode 151 is possible. The upper electrode 151 is formed of a conductive material with low resistance, such as platinum (Pt) or iridium (Ir).

When a voltage is applied between the lower electrode 153 and the upper electrode 151, the piezoelectric material 152 deforms, which causes the piezoelectric element 20 to generate energy for bending the vibration plate 24. The energy generated by the piezoelectric element 20 vibrates the vibration plate 24, thereby changing the pressure in the pressure chamber C and causing ink in the pressure chamber C to be ejected through the nozzle N illustrated in FIG. 3.

Briefly, the piezoelectric element 15 has a stacked structure including interposed members 154, the piezoelectric material 152, and the upper electrode 151 stacked on the vibration plate 24 in this order. The interposed members 154 are located under the piezoelectric material 152. The interposed members 154 are arranged at intervals in the Y-axis direction. The interposed members 154 are formed of the same material as the lower electrodes 153 and are not electrically coupled to the lower electrodes 153. The interposed members 154 are located over the first absorption chamber 44. The lower electrodes 153 are not located over the first absorption chamber 44. In the manufacturing process, the lower electrodes 153 and the interposed members 154 are formed of the same material as one continuous member and are then electrically decoupled by etching before film formation of the piezoelectric material 152 and the like.

Figure 8:
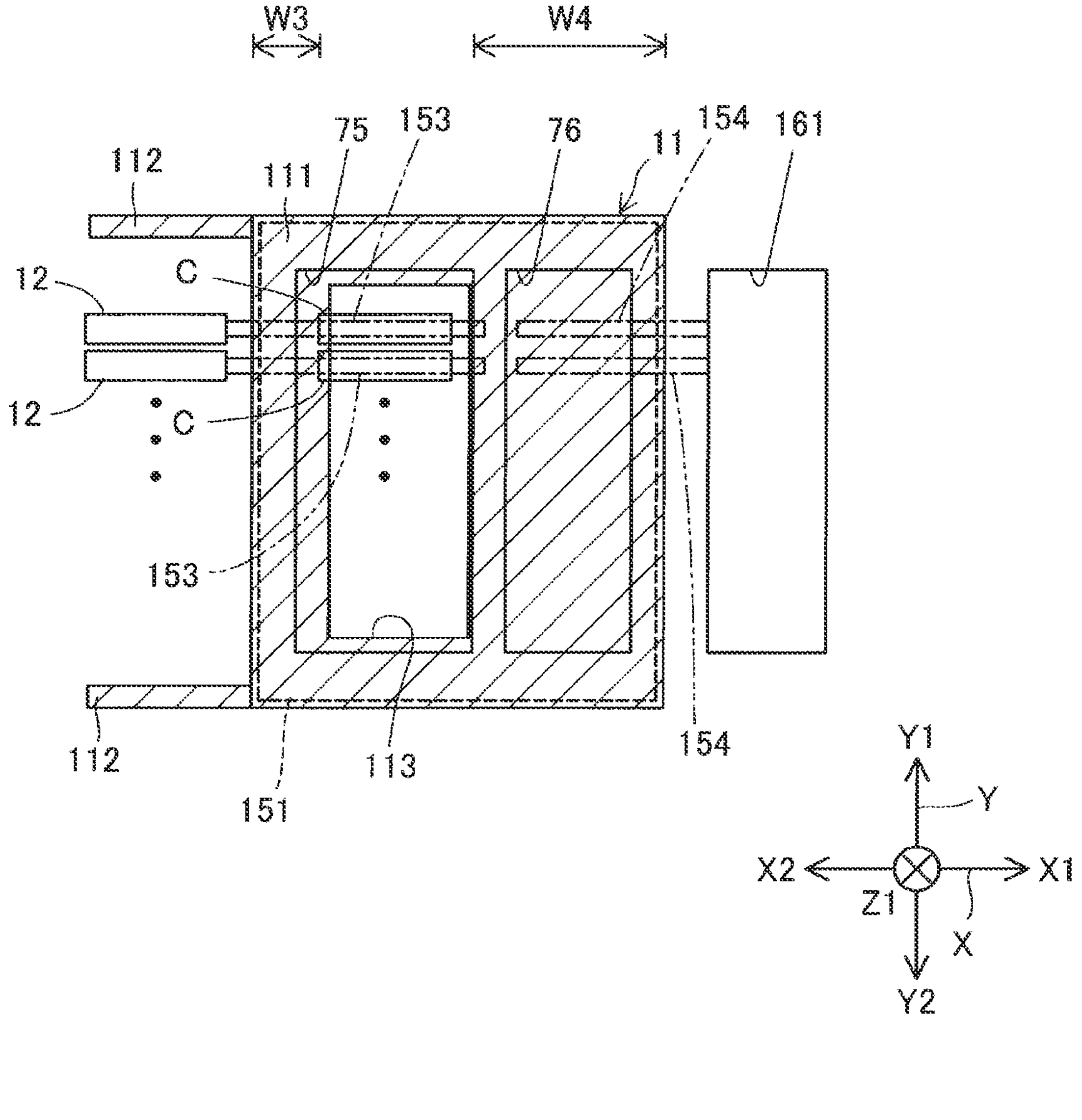
FIG. 8 is a plan view of upper-electrode wiring and its peripheral members.

Next, the wiring structure for electrically coupling the electrodes 151 and 153 to the COF 60 will be described. FIG. 8 is a plan view of upper-electrode wiring 11 and its peripheral members, illustrating the upper-electrode wiring 11 viewed in the Z1 direction. As illustrated in FIGS. 7 and 8, the wiring includes the upper-electrode wiring 11 and lower-electrode wiring 12. The upper-electrode wiring 11 is located over the upper electrode 151 and electrically couples the upper electrode 151 to an external power supply (not illustrated). The lower-electrode wiring 12 electrically couples the lower electrodes 153 to the external power supply (not illustrated).

Figure 9:
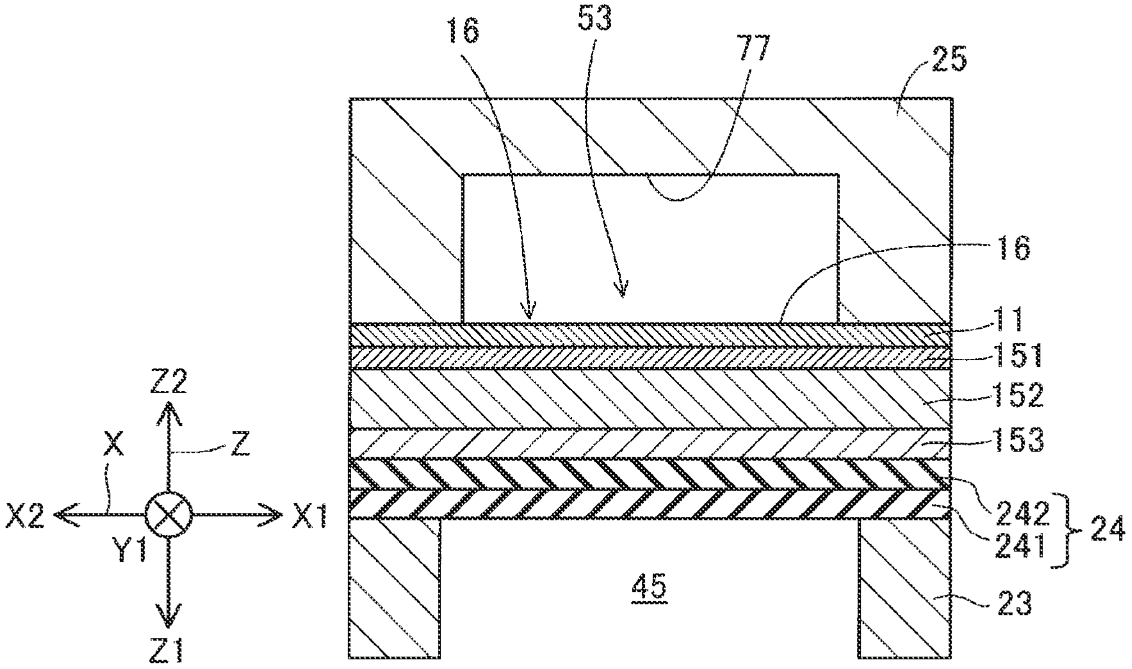
FIG. 9 is an enlarged cross-sectional view of the vibration plate, the piezoelectric element, and part of their vicinities.

Note that in the above FIG. 3, illustration of the electrodes 151 and 153 and the piezoelectric material 152 constituting the piezoelectric elements 20 and 15 and illustration of the wiring electrically coupling each of the electrodes 151 and 153 to the COF 60 is omitted. Since FIGS. 3 and 4 are diagrams for explaining an overall configuration of the liquid ejecting head 10, FIGS. 7 to 9 are more suitable for describing the configurations of the piezoelectric elements 20, 15, and 16 and details of portions including wiring described later.

Each piece of the lower-electrode wiring 12 in plan view has an elongated shape in the X-axis direction. As illustrated in FIG. 7 as an example, the lower-electrode wiring 12 has portions in contact with the upper surfaces of the lower electrodes 153 and portions in contact with the upper surface of the piezoelectric material 152. The lower-electrode wiring 12 is in contact with the end of the piezoelectric material 152 on the X2 side. Although illustration of the end of the lower-electrode wiring 12 on the X2 side is omitted in FIG. 7, the lower-electrode wiring 12 extends in the X2 direction to the COF 60 and is coupled to the COF 60. The lower-electrode wiring 12 applies drive signals to the lower electrodes 153. The lower-electrode wiring 12 consists of lead wires to which drive signals are supplied from the drive circuit mounted on the COF 60 illustrated in FIG. 3.

The upper-electrode wiring 11 is located over the upper electrode 151 and in contact with the upper electrode 151. The upper-electrode wiring 11 applies the reference voltage to the upper electrode 151. The reference voltage (not illustrated) is supplied to the upper-electrode wiring 11 via the COF 60. Provision of the upper-electrode wiring 11 prevents a voltage drop in the reference voltage at the upper electrode 151. The upper-electrode wiring 11 also functions as a mass to reduce the vibration of the vibration plate 24.

Detailed Shape of Upper-Electrode Wiring 11

As illustrated in FIG. 8, the upper-electrode wiring 11 includes a main-body wiring portion 111 and coupling wiring portions 112. In plan view, the overall outer shape of the main-body wiring portion 111 has approximately the same rectangular shape as the upper electrode 151. The main-body wiring portion 111 has a frame shape having an opening 113 at a portion corresponding to the first recess 75 and located in the X2 direction relative to the center of the width in the X-axis direction of the main-body wiring portion 111. Hence, most of the upper-electrode wiring 11 does not overlap the pressure chambers C as viewed in the Z-axis direction.

To be more specific, the upper-electrode wiring 11 is not present over the end of each pressure chamber C on the X1 side (the second side). In contrast, the upper-electrode wiring 11 is present over the end of the pressure chamber C on the X2 side (the first side). As illustrated in FIGS. 7 and 8, the width W3 of the portion of the upper-electrode wiring 11 that partially overlaps the ends of the pressure chambers on the X2 side (the first side) from above is smaller than the width W4 of the portion of the upper-electrode wiring 11 that partially overlaps the first absorption chamber 44 from above.

The width W3 of the portion of the upper-electrode wiring 11 described above corresponds to the width of the portion of the main-body wiring portion 111 on the X2 side of the opening 113. The width W4 of the portion of the upper-electrode wiring 11 described above corresponds to the width of the portion of the main-body wiring portion 111 on the X1 side of the opening 113. Note that the upper electrode 151 does not have an opening and is present also at the position overlapping the pressure chambers C.

The coupling wiring portions 112 extend in the X2 direction from X2-side end portions of the main-body wiring portion 111 at both ends in the Y-axis direction. The length of each coupling wiring portion 112 in the Y-axis direction is shorter than the length of the main-body wiring portion 111 in the Y-axis direction. Each coupling wiring portion 112 has an elongated shape extending in the X-axis direction. An end portion of each coupling wiring portion 112 on the X2 side is coupled to the COF 60.

FIG. 9 is an enlarged cross-sectional view of the vibration plate 24 and the piezoelectric element 16 and part of their vicinities, illustrating the third compliance portion 53 and its vicinities located on the discharge side. As illustrated in FIG. 9, the vibration plate 24, the lower electrode 153, the piezoelectric material 152, the upper electrode 151, and the upper-electrode wiring 11 are stacked in the Z2 direction in this order over the second absorption chamber 45. Note that the upper electrode 151, the lower electrode 153, and the upper-electrode wiring 11 are all electrically isolated. However, unless the piezoelectric element 16 is driven, some of these may be electrically coupled to something else.

Description of Operation and Flow of Liquid

The liquid in the liquid container 2, being caused to flow by the pump 83, flows in the supply flow path 81 and passes through the supply port (not illustrated) into the supply-side common flow path 41. The liquid in the supply-side common flow path 41 passes through the first absorption chamber 44 and is supplied to the pressure chambers C which are parts of the individual flow paths 42. Some of the liquid in the pressure chambers C is ejected through the nozzles N.

The liquid not ejected through the nozzles N passes through the second communication flow paths 66, the third communication flow paths 67, and the second absorption chamber 45, which is part of the individual flow paths 42, and flows into the discharge-side common flow path 43. The liquid in the discharge-side common flow path 43 flows into the collection flow path 82 via the discharge port (not illustrated) and is collected into the liquid container 2. In the liquid ejecting head 10, liquid circulates as described above.

In the pressure chamber C described above, vibration of the vibration plate 24 applies pressure to the liquid in the pressure chamber C. The vibration plate 24 vibrates when the piezoelectric element 20 is driven. Specifically, when a voltage is applied to the piezoelectric material, piezoelectric strain occurs in an active portion of the piezoelectric material, the active portion being stacked between the first electrode and the second electrode in the Z direction. The piezoelectric strain in the piezoelectric element 20 causes the vibration plate 24 to vibrate so as to bend, thereby changing the capacity of the pressure chamber to apply pressure to the liquid in the pressure chamber C. Note that when a voltage is applied to inactive portions of the piezoelectric material not stacked between the upper electrode 151 and the lower electrodes 153 in the Z direction, the piezoelectric strain mentioned above does not occur. In other words, since only the interposed members 154, which are physically and electrically separated from the lower electrodes 153, are provided over the first absorption chamber 44 instead of the lower electrodes 153, piezoelectric strain does not occur over the first absorption chamber 44.

As described above, the liquid ejecting head 10 applies pressure to the liquid in the pressure chamber C to eject liquid through the nozzle N. Here, when pressure is applied to the liquid in the pressure chamber C, some of the liquid in the pressure chamber C flows into the liquid chamber portions or the like located upstream of the pressure chamber C and common to the plurality of pressure chambers C, and the vibration of the liquid propagates from the pressure chamber C to the liquid chamber portions or the like. Here, when pressure is applied to the liquid in the plurality of pressure chambers C, the liquid flowing from a pressure chamber C to the liquid chamber portions and the like is affected in a manner in which, for example, the flow is obstructed by the liquid flowing from another pressure chamber C to the liquid chamber portions and the like. Hence, the manner in which the vibration of liquid propagates from a pressure chamber C varies in accordance with the effects of propagation of the vibration of liquid from another pressure chamber C, and the stability of the quality of the liquid ejected from the nozzle N via the pressure chamber C can deteriorate. Such liquid vibration is suitably absorbed by the compliance portions 51 to 54.

The liquid ejecting head 10 and the liquid ejecting apparatus 1 of the first embodiment described above provide the following advantageous effects.

In the first embodiment described above, the pressure chambers C and the first absorption chamber 44 are located at adjacent positions, and the upper-electrode wiring 11 is present mainly over the first absorption chamber 44 and as little as possible over the pressure chambers C. This configuration prevents degradation in the vibration characteristics of the pressure chambers C, and the portion of the upper-electrode wiring 11 located over the first absorption chamber 44 provides an effect as a mass that reduces the vibration of the vibration plate 24. Although the portion of the upper-electrode wiring 11 located over the first absorption chamber 44 degrades the vibration characteristics, this does not cause a serious problem because the first absorption chamber 44 is not a portion actively used for ejection. This configuration is more suitable than a configuration having the upper-electrode wiring 11 over the pressure chambers C.

In the first embodiment described above, the lower electrodes 153 are not provided over the first absorption chamber 44, and the interposed members 154, which are formed of the same material as the lower electrodes 153 but are not electrically coupled to the lower electrodes 153, are provided over the first absorption chamber 44. This configuration enables the pressure chambers C and the first absorption chamber 44 to be formed of preferably the same materials and to have moduli of elasticity and vibration ratios close to each other, which improves the absorption efficiency of the first absorption chamber 44. In manufacturing, this configuration saves unnecessary etching, compared with a case in which etching is performed for all of the upper portion of the first absorption chamber 44, and thus simplifies the manufacturing of the liquid ejecting head 10.

In the first embodiment described above, since the lower electrodes 153 do not extend in the X direction to the first absorption chamber 44 and are separate from the interposed members 154, even though the upper electrode 151 is one continuous member including the portion over the first absorption chamber 44, the piezoelectric element 15 does not vibrate in the first absorption chamber 44. This configuration saves unnecessary etching for the upper electrode 151 in manufacturing and thus simplifies the manufacturing of the liquid ejecting head 10.

In the first embodiment described above, the width W3 of the portion of the upper-electrode wiring 11 that partially overlaps the ends of the pressure chambers on the X2 side (the first side) from above is smaller than the width W4 of the portion of the upper-electrode wiring 11 that partially overlaps the first absorption chamber 44 from above. Since the wiring located over the first absorption chamber 44 is less likely to affect the ejection characteristics, it is possible to achieve a configuration less likely to affect the ejection characteristics.

In the first embodiment described above, since the stack structures of the piezoelectric elements 20, 15, and 16 and the structure of the vibration plate 24 are the same for the second absorption chamber 45, the pressure chambers C, and the first absorption chamber 44, the same materials can be preferably used as much as possible, which makes the moduli of elasticity close to one another and the vibration characteristics uniform.

In addition, the first compliance portion 51 and the third compliance portion 53 can be formed by a known method, such as etching or the like by, for example, using a photoresist for masking. For example, when the members constituting the actuators including the piezoelectric elements 20 in the first recess 75 are formed, the members constituting the first compliance portion 51 and the third compliance portion 53 can be formed by a method the same as or similar to the method by which the members constituting the actuators are formed. Thus, it is possible to easily form the first compliance portion 51 and the third compliance portion 53 by using the members constituting the actuators. By forming the members constituting the first compliance portion 51 and the third compliance portion 53 and the members constituting the actuators by the same or a similar manufacturing method, it is possible to further simplify the manufacturing process of the liquid ejecting head 10.

B. Other Embodiments (B1) Although the liquid ejecting apparatus 1 in the first embodiment described above employs a circulation head in which the liquid that flows into the liquid ejecting head 10 circulates, the liquid ejecting apparatus 1 may employ a non-circulating head in which liquid does not circulate. Since a non-circulating head does not include the discharge-side common flow path 43, a configuration not including the second absorption chamber 45 and the piezoelectric element 16 and including the piezoelectric elements 20 and 15 is possible.

Although the liquid ejecting apparatus 1 in the first embodiment described above includes the first compliance portion 51 to the fourth compliance portion 54, a configuration only including the first compliance portion 51 is possible. When the second compliance portion 52 and the fourth compliance portion 54 are not included, the portions correspond to the compliance portions 52 and 54 may be formed of the nozzle substrate 21.

(B3) In the liquid ejecting apparatus 1 in the first embodiment described above, the interposed members 154 are optional.

(B4) In the liquid ejecting apparatus 1 of the first embodiment described above, the width W3 of the portion of the upper-electrode wiring 11 that partially overlaps the ends of the pressure chambers on the X2 side (the first side) from above does not have to be smaller than the width W4 of the portion of the upper-electrode wiring 11 that partially overlaps the first absorption chamber 44 from above. In addition, a configuration in which the upper-electrode wiring 11 is not present over the ends of the pressure chambers C on the first side is possible.

(B5) Although the upper electrode 151 is one continuous member extending from over the pressure chambers C to over the first absorption chamber 44 in the liquid ejecting apparatus 1 of the first embodiment described above, the upper electrode 151 may be divided.

(B6) Although the first compliance portion 51 continuously extends in the Y-axis direction across the width of the discharge-side common flow path 43 in the Y-axis direction in the liquid ejecting apparatus 1 of the first embodiment described above, the first compliance portion 51 may be divided in the Y-axis direction into two or more members.

The present disclosure is not limited to the foregoing embodiments and can be implemented in various configurations within a scope not departing from the spirit of present disclosure. For example, the technical features in the embodiments corresponding to the technical features in the aspects described in the summary of the disclosure can be replaced or combined as appropriate to solve some or all of the foregoing problems or to achieve some or all of the foregoing advantageous effects. In addition, unless technical features are described as essential ones in the present specification, they can be omitted as appropriate.

(1) An aspect of the present disclosure provides a liquid ejecting head. The liquid ejecting head includes: a nozzle; a piezoelectric material configured to be driven by a voltage applied to the piezoelectric material; an upper electrode located over the piezoelectric material and electrically coupled to the piezoelectric material; a lower electrode located under the piezoelectric material and electrically coupled to the piezoelectric material; upper-electrode wiring located over the upper electrode and configured to electrically couple the upper electrode to an external power supply; lower-electrode wiring configured to electrically couple the lower electrode to the external power supply; a vibration plate located under the lower electrode and configured to vibrate when the piezoelectric material is driven; and a pressure chamber substrate having a pressure chamber in which vibration of the vibration plate applies pressure to liquid to eject liquid through the nozzle and a first absorption chamber configured to absorb vibration of liquid propagated from the pressure chamber, and the upper electrode and the upper-electrode wiring are present over the first absorption chamber.

Since the upper electrode and the upper-electrode wiring are present over the first absorption chamber in this configuration, the portion of the upper-electrode wiring located over the pressure chambers can be smaller than in a configuration in which, for example, all of the necessary upper-electrode wiring is located over the pressure chambers. Hence, it is possible to minimize degradation in the vibration characteristics of the pressure chambers. In addition, since the upper-electrode wiring is present over the first absorption chamber, this provides an effect of a mass that reduces vibration of the vibration plate. Since the first absorption chamber is not a portion actively driven, some degradation in the vibration characteristics can be allowed.

(2) In the liquid ejecting head of the above aspect, the piezoelectric material and the vibration plate also may be present over the first absorption chamber. This configuration enables the pressure chambers and the first absorption chamber to be formed of preferably the same materials and to have moduli of elasticity close to each other, which improves the absorption efficiency of the first absorption chamber.

(3) In the liquid ejecting head of the above aspect, the lower electrode does not have to be present over the first absorption chamber. With this configuration, it is possible to prevent the piezoelectric element of the first absorption chamber from being driven and vibrating.

(4) In the liquid ejecting head of the above aspect, an interposed member formed of the same material as the lower electrode and not electrically coupled to the lower electrode may be located over the first absorption chamber. Since the interposed member formed of the same material as the lower electrode but not electrically coupled to the lower electrode is present over the first absorption chamber in this configuration, it is possible to form the pressure chamber and the first absorption chamber preferably of the same materials and make the moduli of elasticity close to each other, which improves the absorption efficiency of the first absorption chamber.

(5) In the liquid ejecting head of the above aspect, the upper electrode may be one continuous member extending from over the pressure chamber to over the first absorption chamber. With this configuration, it is possible to save unnecessary etching for the upper electrode, simplifying the manufacturing.

(6) The liquid ejecting head of the above aspect may further include a wiring substrate electrically coupled to the upper-electrode wiring and the lower-electrode wiring, and the wiring substrate, the pressure chamber, and the first absorption chamber may be arranged from a first side to a second side in this order as viewed in an up-down direction.

(7) In the liquid ejecting head of the above aspect, the upper-electrode wiring does not have to be present over an end of the pressure chamber on the second side. Since as little unnecessary material as possible is present over the pressure chamber in this configuration, it is possible to suitably reduce degradation in the vibration characteristics of the pressure chambers.

(8) In the liquid ejecting head of the above aspect, the upper-electrode wiring may be present over an end of the pressure chamber on the first side.

(9) In the liquid ejecting head of the above aspect, a width of a portion of the upper-electrode wiring, the portion being located over the end of the pressure chamber on the first side, may be smaller than a width of a portion of the upper-electrode wiring, the portion being located over the first absorption chamber. This configuration is less likely to affect the ejection characteristics.

(10) In the liquid ejecting head of the above aspect, the pressure chamber substrate may further have a second absorption chamber configured to absorb vibration of liquid propagated from the pressure chamber and located on the first side of the wiring substrate as viewed in the up-down direction, and the liquid ejecting head may further include: a plurality of individual flow paths each including the pressure chamber, the nozzle, the first absorption chamber, and the second absorption chamber; a supply-side common flow path communicating in common with the plurality of individual flow paths and configured to supply liquid to one of the first absorption chamber and the second absorption chamber; and a discharge-side common flow path communicating in common with the plurality of individual flow paths and configured to discharge liquid from the other of the first absorption chamber and the second absorption chamber.

(11) In the liquid ejecting head of the above aspect, the supply-side common flow path may supply liquid to the first absorption chamber, and the discharge-side common flow path may discharge liquid from the second absorption chamber. Since the first absorption chamber for supplying liquid is closer to the pressure chamber than the second absorption chamber for discharging liquid in this configuration, the efficiency of absorbing vibration can be higher. In addition, since the flow rate of the first absorption chamber is higher than that of the second absorption chamber in consideration of the amount of liquid discharged through the nozzle, it is possible to absorb vibration efficiently in the absorption chamber that has a higher flow rate and is affected by vibration more significantly.

(12) In the liquid ejecting head of the above aspect, the upper electrode and the upper-electrode wiring may be present over the second absorption chamber. With this configuration, it is possible to preferably use the same materials for the second absorption chamber, the pressure chamber, and the first absorption chamber, which makes the moduli of elasticity close to one another and the vibration characteristics uniform.

(13) The liquid ejecting head of the above aspect may include a plurality of the pressure chambers, the upper electrode may be provided to be common to the plurality of pressure chambers, and the lower electrode may be provided individually for each of the pressure chambers.

(14) Another aspect of the present disclosure provides a liquid ejecting apparatus. The liquid ejecting apparatus includes: the liquid ejecting head according to the above first configuration; and a controller configured to control ejection operation of ejecting liquid from the liquid ejecting head. With this configuration, it is possible to minimize degradation in the vibration characteristics of the pressure chamber.

The present disclosure can be applied not only to ink jet liquid ejecting apparatuses but also to any liquid ejecting apparatuses that eject liquid other than ink. For example, the present disclosure is applicable to the following various kinds of liquid ejecting apparatuses.

(1) Image printing apparatuses such as fax machines.

(2) Coloring-material ejecting apparatuses used for manufacturing color filters for image display apparatuses such as liquid crystal displays.

(3) Electrode-material ejecting apparatuses used for forming electrodes of organic electro luminescence (EL) displays, field emission displays (FEDs), and the like.

(4) Liquid ejecting apparatuses that eject a liquid containing bio-organic matter used for manufacturing biochips.

(5) Specimen ejecting apparatuses used as precision pipettes.

(6) Lubricating-oil ejecting apparatuses.

(7) Resin-liquid ejecting apparatuses.

(8) Liquid ejecting apparatuses that eject lubricating oil to precision machines such as watches and cameras in a pinpoint manner.

(9) Liquid ejecting apparatus that eject a transparent resin liquid such as a UV curable resin liquid onto a substrate to form micro hemispherical lenses (optical lenses) or the like used in optical communication devices.

(10) Liquid ejecting apparatuses that eject an acidic or alkaline etchant to etch a substrate or the like.

(11) Liquid ejecting apparatuses including a liquid consuming head that ejects droplets including a small amount of liquid of any other kinds.

Note that “droplets” denotes a state of liquid ejected from a liquid ejecting apparatus and include ones with shapes leaving tails having granular shapes, tear-like shapes, and thread-like shapes. Here, “liquid” denotes any material that can be consumed by a liquid ejecting apparatus. For example, “liquid” may refer to a material in a state in which the substances are in a liquid phase and includes materials in the liquid state having a high or low viscosity; sol; gel water; and other materials in a liquid state such as inorganic solvents, organic solvents, solutions, liquid resins, and liquid metals (metal melt). The term “liquid” includes not only liquid as one state of a substance but also solvents in which particles of functional materials composed of solid substances, such as pigments and metal particles, are dissolved, dispersed, or mixed, for example. Typical examples of combinations of a first liquid and a second liquid include the following, in addition to the combination of ink and a reaction liquid described in the above embodiments.

(1) A main agent and a curing agent in an adhesive (2) A base paint and a diluent for a paint, and a clear paint and a diluent (3) A main solvent containing cells and a dilution solvent for ink for cells (4) A metallic leaf pigment dispersion and a dilution solvent for ink (metallic ink) that exhibits metallic luster (5) Gasoline, light oil, and biofuel for vehicle fuel (6) Base components and protective components for medicines (7) Phosphors and encapsulants for light-emitting diodes (LEDs)

In addition, the present disclosure can be implemented, in addition to the aspects as the foregoing liquid ejecting head and liquid ejecting apparatus, in various aspects such as a liquid ejecting system and a multifunction printer including a liquid ejecting apparatus.

What is claimed is:

1. A liquid ejecting head comprising:

a nozzle;

a piezoelectric material configured to be driven by a voltage applied to the piezoelectric material;

an upper electrode located over the piezoelectric material and electrically coupled to the piezoelectric material;

a lower electrode located under the piezoelectric material and electrically coupled to the piezoelectric material;

upper-electrode wiring located over the upper electrode and configured to electrically couple the upper electrode to an external power supply;

lower-electrode wiring configured to electrically couple the lower electrode to the external power supply;

a wiring substrate electrically coupled to the upper-electrode wiring and the lower-electrode wiring;

a vibration plate located under the lower electrode and configured to vibrate when the piezoelectric material is driven; and a pressure chamber substrate having a pressure chamber in which vibration of the vibration plate applies pressure to liquid to eject liquid through the nozzle and a first absorption chamber configured to absorb vibration of liquid propagated from the pressure chamber, wherein the upper electrode and the upper-electrode wiring are present over the first absorption chamber, the wiring substrate, the pressure chamber, and the first absorption chamber are arranged from a first side to a second side in this order as viewed in an up-down direction, and the upper-electrode wiring is not present over an end of the pressure chamber on the second side.

2. The liquid ejecting head according to claim 1, wherein the piezoelectric material and the vibration plate also are present over the first absorption chamber.

3. The liquid ejecting head according to claim 2, wherein the lower electrode is not present over the first absorption chamber.

4. The liquid ejecting head according to claim 3, wherein an interposed member formed of the same material as the lower electrode and not electrically coupled to the lower electrode is located over the first absorption chamber.

5. The liquid ejecting head according to claim 1, wherein the upper electrode is one continuous member extending from over the pressure chamber to over the first absorption chamber.

6. The liquid ejecting head according to claim 1, wherein the upper-electrode wiring is present over an end of the pressure chamber on the first side.

7. The liquid ejecting head according to claim 6, wherein a width of a portion of the upper-electrode wiring, the portion being located over the end of the pressure chamber on the first side, is smaller than a width of a portion of the upper-electrode wiring, the portion being located over the first absorption chamber.

8. The liquid ejecting head according to claim 1, wherein the pressure chamber substrate further has a second absorption chamber configured to absorb vibration of liquid propagated from the pressure chamber and located on the first side of the wiring substrate as viewed in the up-down direction, and the liquid ejecting head further comprises:

a plurality of individual flow paths each including the pressure chamber, the nozzle, the first absorption chamber, and the second absorption chamber;

a supply-side common flow path communicating in common with the plurality of individual flow paths and configured to supply liquid to one of the first absorption chamber and the second absorption chamber; and a discharge-side common flow path communicating in common with the plurality of individual flow paths and configured to discharge liquid from the other of the first absorption chamber and the second absorption chamber.

9. The liquid ejecting head according to claim 8, wherein the supply-side common flow path supplies liquid to the first absorption chamber, and the discharge-side common flow path discharges liquid from the second absorption chamber.

10. The liquid ejecting head according to claim 8, wherein the upper electrode and the upper-electrode wiring are present over the second absorption chamber.

11. The liquid ejecting head according to claim 1, comprising a plurality of the pressure chambers, wherein the upper electrode is provided to be common to the plurality of pressure chambers, and the lower electrode is provided individually for each of the pressure chambers.

12. A liquid ejecting apparatus comprising:

the liquid ejecting head according to claim 1; and a controller configured to control ejection operation of ejecting liquid from the liquid ejecting head.

13. A liquid ejecting head comprising:

a nozzle;

a piezoelectric material configured to be driven by a voltage applied to the piezoelectric material;

an upper electrode located over the piezoelectric material and electrically coupled to the piezoelectric material;

a lower electrode located under the piezoelectric material and electrically coupled to the piezoelectric material;

upper-electrode wiring located over the upper electrode and configured to electrically couple the upper electrode to an external power supply;

lower-electrode wiring configured to electrically couple the lower electrode to the external power supply;

a wiring substrate electrically coupled to the upper-electrode wiring and the lower-electrode wiring;

a vibration plate located under the lower electrode and configured to vibrate when the piezoelectric material is driven; and a pressure chamber substrate having a pressure chamber in which vibration of the vibration plate applies pressure to liquid to eject liquid through the nozzle and a first absorption chamber configured to absorb vibration of liquid propagated from the pressure chamber, wherein the upper electrode and the upper-electrode wiring are present over the first absorption chamber, the wiring substrate, the pressure chamber, and the first absorption chamber are arranged from a first side to a second side in this order as viewed in an up-down direction, the pressure chamber substrate further has a second absorption chamber configured to absorb vibration of liquid propagated from the pressure chamber and located on the first side of the wiring substrate as viewed in the up-down direction, and the liquid ejecting head further comprises:

a plurality of individual flow paths each including the pressure chamber, the nozzle, the first absorption chamber, and the second absorption chamber;

a supply-side common flow path communicating in common with the plurality of individual flow paths and configured to supply liquid to one of the first absorption chamber and the second absorption chamber; and a discharge-side common flow path communicating in common with the plurality of individual flow paths and configured to discharge liquid from the other of the first absorption chamber and the second absorption chamber.

14. The liquid ejecting head according to claim 13, wherein the supply-side common flow path supplies liquid to the first absorption chamber, and the discharge-side common flow path discharges liquid from the second absorption chamber.

15. The liquid ejecting head according to claim 13, wherein the upper electrode and the upper-electrode wiring are present over the second absorption chamber.

* * * * *